United States Patent
Lee

(10) Patent No.: US 7,903,675 B2
(45) Date of Patent: Mar. 8, 2011

(54) METHOD AND APPARATUS FOR SETTING UP POINT-TO-POINT PROTOCOL LINK BETWEEN TERMINAL EQUIPMENT AND INTERWORKING FUNCTION

(75) Inventor: Hyun-Gu Lee, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 586 days.

(21) Appl. No.: 11/859,512

(22) Filed: Sep. 21, 2007

(65) Prior Publication Data

US 2008/0075098 A1  Mar. 27, 2008

(30) Foreign Application Priority Data

Sep. 21, 2006  (KR) .................. 10-2006-0091807

(51) Int. Cl.
*H04L 12/28*  (2006.01)
(52) U.S. Cl. ...................... 370/401; 709/238
(58) Field of Classification Search .............. 370/401, 370/349; 709/238
See application file for complete search history.

(56) References Cited

U.S. PATENT DOCUMENTS

| | | | |
|---|---|---|---|
| 6,414,939 B1* | 7/2002 | Yamato | 370/236.1 |
| 2003/0007479 A1* | 1/2003 | Abrol et al. | 370/349 |
| 2005/0107084 A1* | 5/2005 | Dyck et al. | 455/436 |
| 2006/0182128 A1* | 8/2006 | Nakata et al. | 370/401 |

* cited by examiner

*Primary Examiner* — Dang T Ton
*Assistant Examiner* — Wei Zhao
(74) *Attorney, Agent, or Firm* — The Farrell Law Firm, P.C.

(57) ABSTRACT

A method and apparatus for setting up a Point-to-Point Protocol (PPP) link between a Terminal Equipment (TE) and a Mobile Terminal (MT), and between the MT and a Base Station Interworking Function (IWF). A method for setting up a PPP link for transmitting a packet between a TE and an IWF, which connects the TE and a packet network to each other, includes determining first option information to be used for a PPP link on a Um interface between an MT and the IWF, determining second option information to be used for a PPP link on an Rm interface between the MT and the TE, to make the second option information identical to the first option information; and transmitting, by the MT, frames transmitted/received through the PPP links between the TE and the IWF in a pseudo network mode, when the first and second option information have been determined.

4 Claims, 7 Drawing Sheets

LCP Configure-Request Frame Format (500)

| 0xC021 | 0x01 | ID | length | Options (500a) |
|--------|------|----|--------|----------------|

LCP Configure-ACK Frame Format (502)

| 0xC021 | 0x02 | ID | length | Options (502a) |
|--------|------|----|--------|----------------|

LCP Configure-NAK Frame Format (504)

| 0xC021 | 0x03 | ID | length | NAKed option (504a) |
|--------|------|----|--------|---------------------|

LCP Configure-Reject Frame Format (506)

| 0xC021 | 0x04 | ID | length | Rejected option (506a) |
|--------|------|----|--------|------------------------|

FIG.5

METHOD AND APPARATUS FOR SETTING UP POINT-TO-POINT PROTOCOL LINK BETWEEN TERMINAL EQUIPMENT AND INTERWORKING FUNCTION

PRIORITY

This application claims priority under 35 U.S.C. §119(a) to an application filed in the Korean Intellectual Property Office on Sep. 21, 2006 and assigned Serial No. 2006-91807, the contents of which are incorporated herein by reference.

BACKGROUND OF THE INVENTION

1. Field of the Invention

The present invention generally relates to a method and apparatus for providing wireless data service, and more particularly to a method and apparatus for setting up a Point-to-Point Protocol (PPP) link between a Terminal Equipment (TE) and a Mobile Terminal (MT), and between the MT and a Base Station (BS) Interworking Function (IWF).

2. Description of the Related Art

Generally, in wireless data communication using a Personal Computer (PC), devices making communication perform a subscriber authentication between them using PPP, and are assigned with Internet Protocol (IP) addresses. The PPP is a scheme widely used for access to the Internet, and is defined as a standard in RFC (Request For Comment) 1661 and RFC 1162, to which reference will be made in the following description.

FIG. 1 shows a protocol stack of each entity in a typical wireless communication system. A Terminal Equipment (TE2) 101 is directly connected to a Mobile Terminal (MT2) 102 over a serial interface (I/F) 114 of an Rm communication scheme, in which the connection is achieved by a medium including, for example, an RS-232, a Universal Serial Bus (USB), and/or other wired/wireless interfaces. The MT2 102 communicates wirelessly with an IWF 104 through a BS 103.

In FIG. 1, the TE2 101 includes a mobile terminal, a laptop computer, a palmtop computer, or the like, and the MT2 102 includes devices, such as a Personal Digital Assistant (PDA) portable telephone, etc., capable of performing data communication through wireless access to the BS 103.

At the far left of FIG. 1 is a protocol stack depicting the protocol layers running on the TE2 101. The protocol stack of the TE2 101 is logically connected to a protocol stack of the MT2 102 over an Rm interface 150. The protocol stack of the MT2 102 is connected to a protocol stack of the BS 103 over a Um interface 160. The protocol stack of the BS 103 is logically connected to a protocol stack of the IWF 104 over an L interface 170.

The protocol stacks will now be described.

A Radio Link Protocol (RLP) 126 and an Interim Standard 95 (IS-95) protocol 127 are standards defined to transfer upper data in Code Division Multiple Access (CDMA) mobile communication. In uplink data communication from the TE2 101, packets generated in an upper layer 111 are transferred through a network layer 112 to a PPP-R layer 113, and then are framed into PPP frames in the PPP-R layer 113.

The generated PPP frames are transferred to the MT2 102 through the serial interface 114. The MT2 102 unframes the PPP frames received through a serial interface 124 in a PPP-R layer 123, and again generates PPP frames to be transmitted to the IWF 104. This is because it is necessary to reconstruct frames depending on negotiated PPP link options on the Um interface. That is, the PPP-R layer 123 transfers the unframed packets to a PPP-U layer 125, and the PPP-U layer 125 frames the packets into PPP frames to be transmitted to a PPP peer in which the IWF 104 is located.

The PPP-R layer 113 of the TE2 101 and the PPP-R layer 123 of the MT2 102 negotiate Link Control Protocol (LCP) options to configure the Rm interface 150.

The RLP 126 and the IS-95 protocol 127, both of which are well known in the art, are used to transmit packets encapsulated in PPP frames to the BS 103 over the Um interface 160. An RLP layer 128 and an IS-95 layer 129 of the BS 103 transfers the packets to a relay layer 130 of the BS 103 to transmit the packets to a relay layer 149 of the IWF 104 over the L interface 170. The relay layer 149 of the IWF 104 transfers the packets received from the relay layer 130 of the BS 103 to upper layers 145, 142 and 141 in the IWF 104.

Thereafter, PPP frames are transferred to the IWF 104 through the BS 103, the PPP-U layer 145 unframes received packets, and the network layer 142 packets received from the PPP-U layer 145 to the upper layer 141. Even in the case of downlink data communication, the aforementioned uplink data communication procedure is identically applied according to the reverse order of the procedure.

As described above in connection with the prior art, since links in which a plurality of PPP sessions have been negotiated have different characteristics, it is necessary to perform an unframing (decapsulating) process and a framing (encapsulating) process in order to relay frames, thereby increasing the processing load on a processor, so that a restriction occurs in performance for data communication which is progressing toward faster service. International Publication Number WO 01/05177 A1, published on Jan. 18, 2001, discloses a method which causes each of the PPP-R layer 123 and PPP-U layer 124 to have a default option, to determine whether finally negotiated options are the same, and to omit the unframing and framing processes only when the finally negotiated options are the same.

However, the conventional method described above has a disadvantage in that when an option finally negotiated between the PPP-R layer, which negotiates option values between the Rm interfaces, and the PPP-U layer, which negotiates option values between the Um interfaces, has a value other than the default value defined in the specification, the method cannot be applied. That is, the above-described conventional method can be applied only when option values for configuring an LCP have been negotiated to an initial default value at both of Rm interface and Um interface, so the application range of the method is greatly restricted.

SUMMARY OF THE INVENTION

The present invention substantially solves the above-mentioned problems occurring in the prior art, and provides a method and apparatus for setting up a PPP link between an MT and a BS IWF.

In addition, the present invention provides a method and apparatus for allowing an MT to first progress negotiation of options for a Um interface using default values, which are basic option values, and to use options finally selected in a PPP-U layer as forced option values for a negotiation of options for an Rm interface.

In accordance with an aspect of the present invention, there is provided a method for setting up a PPP link for transmitting a packet between a TE and an IWF, which connects the TE and a packet network to each other, the method including determining first option information to be used for a PPP link on a Um interface between a MT and the IWF, through negotiation according to a LCP between the MT and the IWF; determining second option information to be used for a PPP link on an Rm interface between the MT and the TE, through LCP negotiation between the MT and the TE in such a manner to make the second option information be identical to the first option information; and transmitting, by the MT, frames transmitted/received through the PPP links between the TE and the IWF in a pseudo network mode, in which unframing and framing processes are not performed, when the first and second option information have been determined.

In accordance with another aspect of the present invention, there is provided an apparatus for setting up a PPP link between a TE and an IWF, which connects the TE and a packet network to each other, in an MT for setting up the PPP link for transmitting a packet between the TE and the IWF, the apparatus including a first function block for determining first option information to be used for a PPP link on a Um interface between the MT and the IWF, through negotiation according to a LCP between the MT and the IWF, and transmitting/receiving frames through the Um interface; a second function block for determining second option information to be used for a PPP link on an Rm interface between the TE and the MT, through LCP negotiation between the TE and the MT in such a manner as to make the second option information be identical to the first option information, and transmitting/receiving frames through the Rm interface; and a data processing block for transferring the first option information determined by the first function block to the second function block, and when the first and second option information have been determined, instructing the first and second function blocks to operate in a pseudo network mode of not unframing and framing frames transmitted/received through the PPP links between the TE and the IWF.

In accordance with still another aspect of the present invention, there is provided a method for setting up a PPP link for transmitting a packet between a TE and a first IWF, which connects the TE and a packet network to each other, the method including determining first option information to be used for a PPP link on a Um interface between a MT and a second IWF, through negotiation according to a LCP between the MT and the second IWF, when the TE transmits/receives a packet to/from the second IWF on account of a handover of the MT; checking whether the second option information used for a PPP link on an Rm interface between the MT and the TE is identical to the first option information; and transmitting, by the MT, frames transmitted/received through the PPP links between the TE and the second IWF in a pseudo network mode, in which unframing and framing processes are not performed, when the first and second option information are determined to be identical to each other as a result of the checking.

In accordance with still another aspect of the present invention, there is provided an apparatus for setting up a PPP link between a TE) and an IWF, which connects the TE and a packet network to each other, in a MT for setting up the PPP link for transmitting a packet between the TE and the IWF, the apparatus including a first function block for determining first option information to be used for a PPP link on a Um interface between the MT and a second IWF, through negotiation according to a LCP between the MT and the second IWF, and transmitting/receiving frames through the Um interface when the TE transmits/receives a packet to/from the second IWF on account of a handover of the MT; a second function block for determining second option information to be used for a PPP link on an Rm interface between the TE and the MT, through LCP negotiation between the TE and the MT, and transmitting/receiving frames through the Rm interface; and a data processing block for instructing the first and second function blocks to operate in a pseudo network mode of not unframing and framing frames transmitted/received through the PPP links between the TE and the second IWF, when the first option information determined by the first function block is identical to the second option information used in the second function block.

BRIEF DESCRIPTION OF THE DRAWINGS

The above and other aspects, features and advantages of the present invention will be more apparent from the following detailed description taken in conjunction with the accompanying drawings, in which:

FIG. 5 is a view illustrating the formats of a Configure-Request packet, a Configure-ACK packet, a Configure-NAK packet, and a Configure-Reject packet to be used for an LCP option negotiation according to the present invention;

DETAILED DESCRIPTION OF THE PREFERRED EMBODIMENTS

Preferred embodiments of the present invention are described below with reference to the accompanying drawings. In the following description, a detailed description of known functions and configurations incorporated herein will be omitted when they may obscure the subject matter of the present invention.

A brief summary of the present invention is given below.

Figure 7:
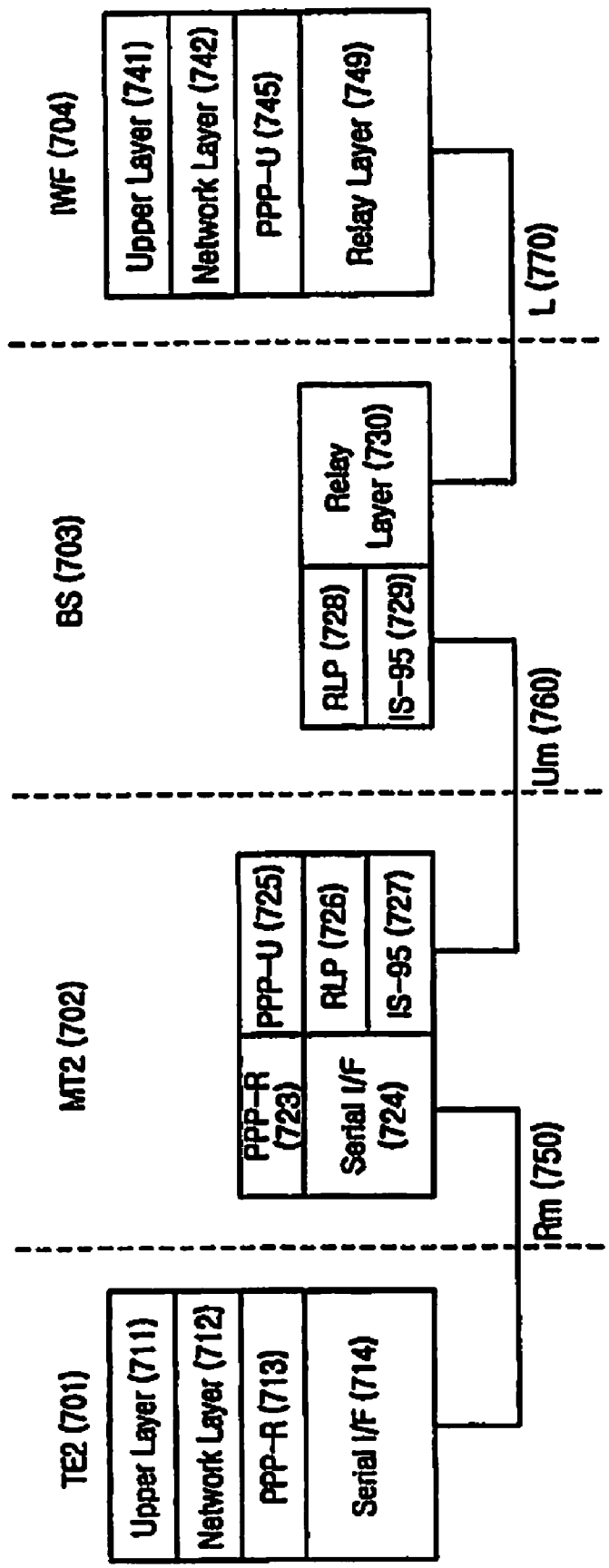
FIG. 7 is a block diagram illustrating the protocol stack of each entity in a wireless communication system according to the present invention.

The present invention provides a method and apparatus by which a Mobile Terminal (MT2) first progresses negotiation of options for a Um interface by means of a default value, and uses options finally selected in a PPP-U layer 725, as shown in FIG. 7, as forced option values for a negotiation of options for an Rm interface. Accordingly, link options for a PPP-R 723 and link options for the PPP-U 725 are identical to each other, thereby preventing unnecessary PPP unframing/framing procedures from being performed.

Also, when a handover occurs between Packet Data Service Networks (PDSNs) while MP2 is moving to a new Interworking Function (IWF) in a mobile IP system, MP2 attempts to reconnect the PPP-U layer 725 of the Um interface. In the case where the MP2 attempts to reconnect a new Um interface to a new PDSN, when a Link Control Protocol (LCP) option is changed, the MP2 is forced to determine an option negotiated with the PDSN of a network before the handover, and when the forced determination fails, a PPP-R layer for an Rm interface is reconfigured with a newly updated option, thereby resuming transmission without interruption of communication, and omitting unframing/framing procedures for relaying PPP frames.

FIG. 7 shows a protocol stack of each entity in a wireless communication system according to the present invention. A Terminal Equipment (TE2) 701 is directly connected to a Mobile Terminal (MT2) 702 over a serial interface (I/F) 714 of an Rm communication scheme, in which the connection is achieved by a medium including, for example, an RS-232, a Universal Serial Bus (USB), and/or other wired/wireless interfaces. The MT2 702 communicates wirelessly with an IWF 704 through a Base Station (BS) 703.

In FIG. 7, the TE2 701 includes a mobile terminal, a laptop computer, a palmtop computer, or the like, and the MT2 702 includes devices, such as a Personal Digital Assistant (PDA) portable telephone, etc., capable of performing data communication through wireless access to the base station.

Figure 1:
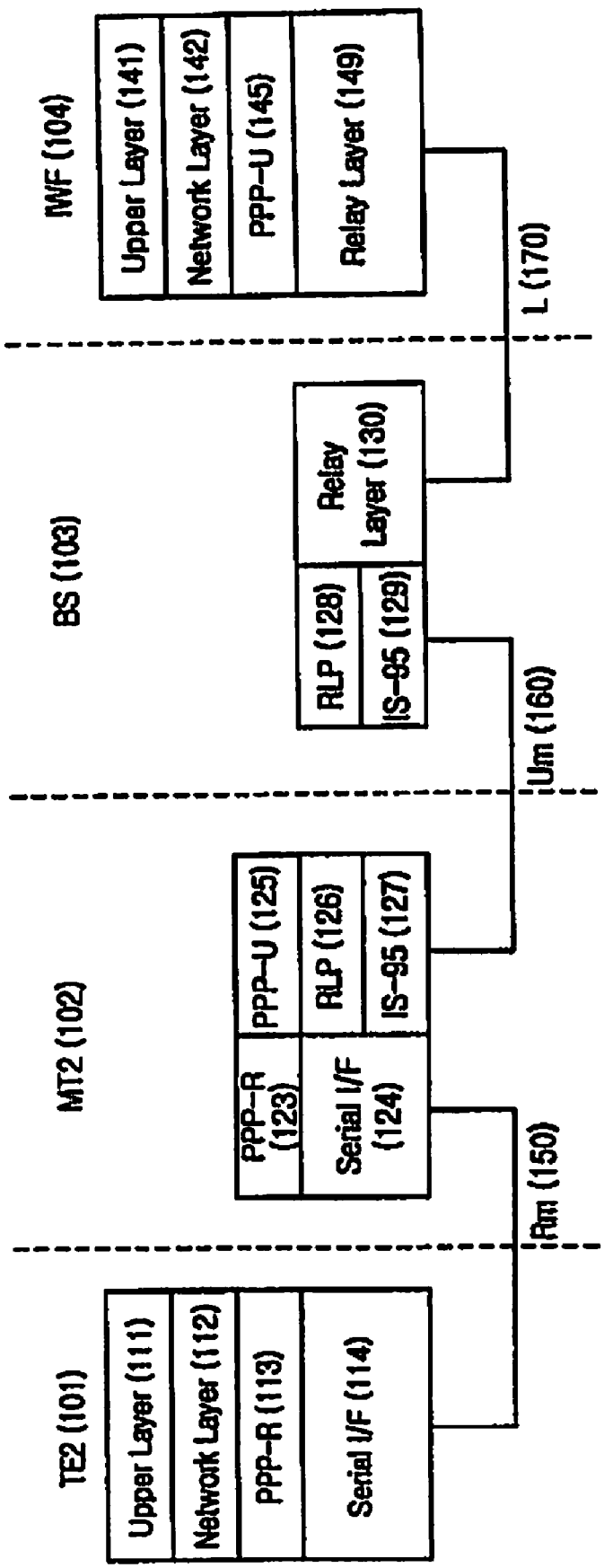
FIG. 1 is a block diagram illustrating the protocol stack of each entity in a typical wireless communication system.

At the far left of FIG. 7 is a protocol stack depicting the protocol layers running on the TE2 701. The protocol stack of the TE2 701 is logically connected to a protocol stack of the MT2 702 over an Rm interface 750. The protocol stack of the MT2 702 is connected to a protocol stack of the BS 703 over a Um interface 760. The protocol stack of the BS 703 is logically connected to a protocol stack of the IWF 704 over an L interface 770. The protocol stack of each entity in a wireless communication system, as shown in FIG. 7, is similar to the protocol stack shown in FIG. 1. Also, in the following description, a PDSN and an IWF designates the same device.

Figure 2:
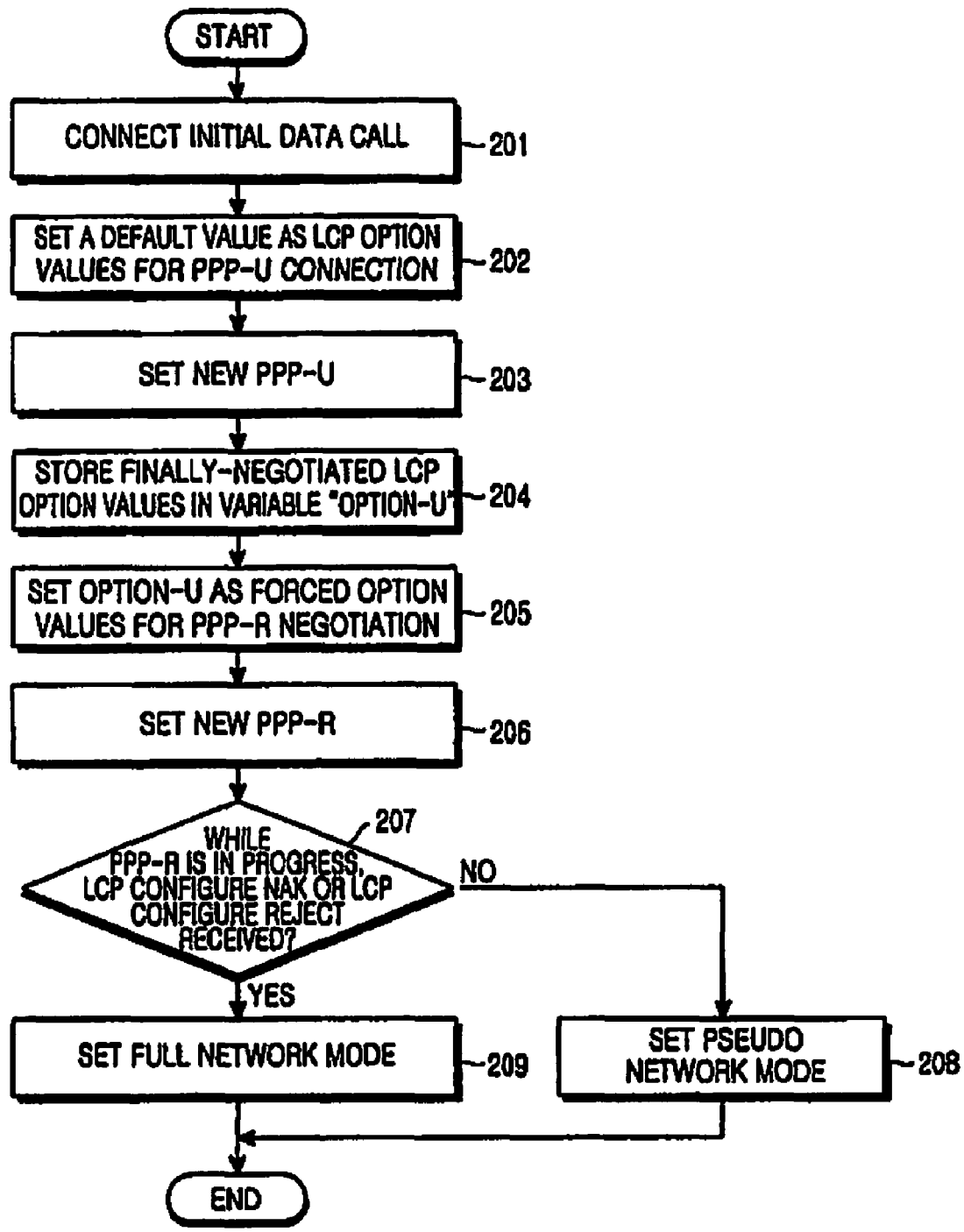
FIG. 2 is a flowchart illustrating a procedure in which an MT2 negotiates a PPP-U option value of a Um interface to a default LCP option value, and negotiates a default LCP option of a PPP-R for an Rm interface to an option value finally negotiated at the Um interface according to the present invention.

FIG. 2 shows a procedure in which an MT2 600 negotiates a PPP-U option value of a Um interface to a default Link Control Protocol (LCP) option value, negotiates a default LCP option of a PPP-R for an Rm interface 150 to an option value finally negotiated at the Um interface, and sets the operation mode of the MT2 600 based on results of the negotiations according to the present invention.

In the following description, a PPP link for transmitting a frame from an IWF 104 to a Terminal Equipment (TE2) 101 will be referred to as a "downlink," and a PPP link for transmitting a frame from the TE2 101 to the IWF 104 will be referred to as an "uplink."

Figure 3:
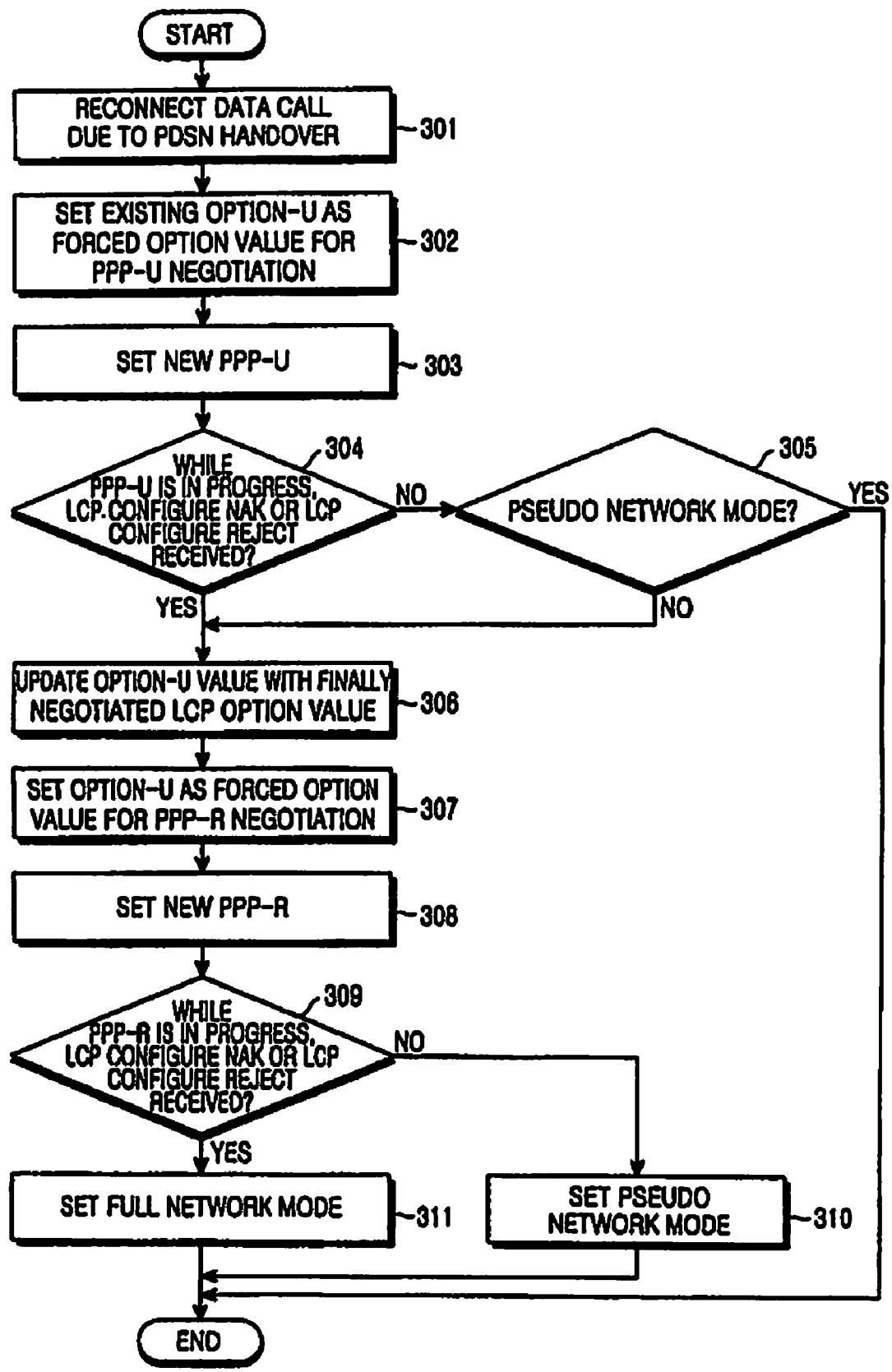
FIG. 3 is a flowchart illustrating an operation procedure of reconnecting a PPP-U when the MT2 performs a handover, and simultaneously the IWF having set up a PPP link with the MT2 is also handed over according to the present invention.

FIG. 3 shows a procedure in which the MT2 702 uses an option value negotiated with a previous IWF as a basic value when the MT2 702 is to reconnect a Um PPP to a new IWF on account of a handover occurring between PDSNs in a mobile IP network, and reconfigures an Rm PPP when a finally-negotiated Um interface option value is different from the option value negotiated with the previous IWF according to the present invention.

The operation of the present invention to achieve the objects will now be described with reference to FIGS. 2 and 3, and FIG. 6 later.

The Referring to FIG. 2, when an initial data call is connected in step 201, the MT2 600 first attempts to connect a PPP for a Um interface 760 in order to configure a PPP with an IWF 704. In this case, a default value set as a basic value in the standard is used as an LCP option for a negotiation in step 202. When the LCP negotiation has been successfully finished in step 202, an authentication process and an IP Control Protocol (IPCP) process are consecutively performed according to a normal PPP procedure. When all the processes have been finished, a new PPP-U is connected in step 203. In steps 201 to 203, a peer, that is, an object with which the MT2 600 negotiates the PPP, is the IWF 704.

In step 204, the MT2 600 stores an LCP option, which has been finally negotiated upon the configuration of the PPP-U connection, in variable "Option-U" of an LCP option negotiation unit 411 in a PPP-U function block 602. When finishing the PPP-U connection, the MT2 600 must configure a PPP connection for the Rm interface 750, in which the MT2 600 fetches the Option-U of the LCP option negotiation unit 411, and sets the Option-U as a forced LCP option value to be used for a PPP-R connection in step 205.

Generally, in a PPP negotiation procedure, a device sends an acknowledgement (ACK) packet, which is an affirmative response, when accepting an option value of a peer side, and sends a non-acknowledgement (NAK) packet, which is a negative response, including an option value requested by the device when rejecting the option value of the peer side. In addition, if the device does not support any option, the device transmits a REJECT packet, which is a rejection message, to the peer.

However, according to the present invention, the Option-U negotiated in the PPP-U configuration procedure of step 203 is used as a forced negotiation value for the PPP-R configuration procedure in step 205. In step 206, when a TE2 701, which is a peer, requests an option value other than an option value included in the Option-U, which is option information negotiated in step 203, the MT2 600 transmits a NAK packet to the TE2 701 so the Option-U which is option information used for the PPP link on the Um interface can be used for the PPP link on the Rm interface. In steps 206 to 209 of FIG. 2, the peer which is an object of PPP negotiation is the TE2 701.

While negotiating the PPP-R with the TE2 701 in step 206, the MT2 600 checks if the MT2 600 receives an LCP Configuration Non-acknowledgement response (Configure-NAK) or a packet of a configuration rejection (Configure-Reject) type, thereby determining whether the MT2 600 is to operate in a full network mode of step 209 or a pseudo network mode of step 208 in step 207. That is, when the MT2 600 has received an LCP Configure-NAK or LCP Configure-Reject packet while negotiating the PPP-R option value in step 207, the MT2 600 proceeds to step 209, in which the MT2 600 operates in the full network mode. In contrast, when the MT2 600 receives neither an LCP Configure-NAK nor an LCP Configure-Reject packet in step 207, the MT2 600 proceeds to step 208, in which the MT2 600 operates in the pseudo network mode. Step 206 of FIG. 2 corresponds to steps 460 to 470 of FIG. 4 later, and a procedure in which the MT2 600 proceeds from step 207 to step 208 so as to be set to the pseudo network mode corresponds to a case where the MT2 600 receives a Configure-ACK packet from the TE2 701 in step 462 of FIG. 4. In contrast, a procedure in which the MT2 600 proceeds from step 207 to step 209 corresponds to a case where the MT2 600 receives a Configure-NAK or Configure-Reject packet from the TE2 701 in step 462 of FIG. 4 later and is set to the full network mode. That is, when a request of the MT2 600 for use of an option value negotiated for the PPP-U is rejected by the TE2 701 in step 206 of FIG. 2, the MT2 600 operates in the full network mode.

The full network mode is applied when LCP options between a PPP-U and a PPP-R, i.e., between a Um interface and an Rm interface are not equal to each other, in which the MT2 600 performs unframing/framing procedures while relaying a PPP frame. In contrast, the pseudo network mode represents a mode in which the unframing/framing procedures are omitted because LCP options configured between a PPP-U and a PPP-R are equal to each other. Therefore, operating in the pseudo network mode other than the full network mode can reduce the entire system load. The network operation modes employed in the present invention imply operation modes of a network in which PPP setup including LCP negotiation completion is done.

The present invention is implemented in such a manner as to maximize the possibility of operating in the pseudo network mode, rather than the full network mode.

FIG. 3 shows an operation procedure of reconnecting a PPP-U, when the MT2 600 performs a handover, and simultaneously the IWF 704, which is a PDSN having set up a PPP link with the MT2 600, is also handed over according to the present invention.

The When an IWF is changed due to a handover of the MT2 600, it will be referred to as an "inter-IWF handover" in this document.

When an inter-IWF handover (inter-PDSN handover) is performed, and a data call connection is achieved between the MT2 600 and the IWF 704 in step 301, a PPP-U reconnection is attempted. When the PPP-U reconnection is attempted, the Option-U, which is option information determined through a negotiation with the IWF (PDSN) 704 before the handover, is used as a forced negotiation value for an LCP option in step 302.

In step 303, during the PPP-U configuration procedure, when a peer, which is an object of PPP negotiation, i.e., the IWF 704, requests a value other than the Option-U, the MT2 600 transmits a NAK so the existing Option-U determined to be used in step 302 can be used, even in a new network, as determined.

The When completing the PPP-U connection procedure, the MT2 600 checks whether the MT2 600 has received an LCP Configure-NAK packet or LCP Configure-Reject packet from the IWF 704, which is a peer, during the negotiation in step 304.

When an LCP Configure-NAK packet or LCP Configure-Reject packet has been determined as not having been received in step 304 during the negotiation, and the negotiation has been completed to use Option-U which is the same as the previous option values determined in step 302, the MT2 600 proceeds to step 305, in which the MT2 600 determines whether the current operation mode of the MT2 600 is the pseudo network mode.

In contrast, when the MT2 600 has been determined as having received an LCP Configure-NAK or LCP Configure-Reject packet in step 304, the MT2 600 proceeds to step 306, in which the MT2 600 gets an opportunity to achieve the synchronization of options in the PPP-R layer once more by means of options finally determined through the PPP-U negotiation.

Meanwhile, when the current operation mode is determined to be the pseudo network mode in step 305, the MT2 600 does not need to perform a PPP negotiation in the PPP-R layer 723, and thus the connection configuration procedure ends. In step 305, the MT2 600 may determine whether the Option-U negotiated in step 303 is identical to option information used in the PPP link for the Rm interface between the MT2 600 and the TE2 701, in order to determine whether the MT2 600 is in the pseudo network mode.

In contrast, when the current operation mode of the MT2 600 is determined to be the full network mode and not the pseudo network mode in step 305, the MT2 600 proceeds to step 306, in which the MT2 600 gets an opportunity to achieve the synchronization of options between the PPP-U (i.e. the Um interface 760) and the PPP-R (i.e. Rm interface 750) once more.

When the MT2 600 has been determined in step 304 as having received an LCP Configure-NAK or LCP Configure-Reject packet from the IWF 704, which is a peer, while the PPP-U negotiation is in progress, and thus PPP-R renegotiation is to be carried out, the MT2 600 proceeds to step 306. In step 306, the MT2 600 updates variable "Option-U" of the LCP option negotiation unit 411 with option information finally negotiated in the PPP-U, as in step 303, and proceeds to step 307. In step 307, the MT2 600 sets the option values, which has been stored in variable "Option-U" in step 306, as a forced option, and proceeds to step 308 in which the MT2 600 attempts to perform a PPP-R reconnection procedure.

When the PPP-R reconfiguration has been completed in step 308, the MT2 600 checks if the MT2 600 has received an LCP Configure-NAK or LCP Configure-Reject packet from the TE2 701, which is a peer, during the negotiation in step 309. Then, the MT2 600 operates either in the full network mode in step 311 or the pseudo network mode in step 310 according to the result of the checking of step 309. Steps 309 to 311 in FIG. 3 are the same as steps 207 to 209 in FIG. 2, so a detailed description thereof will be omitted.

Figure 4:
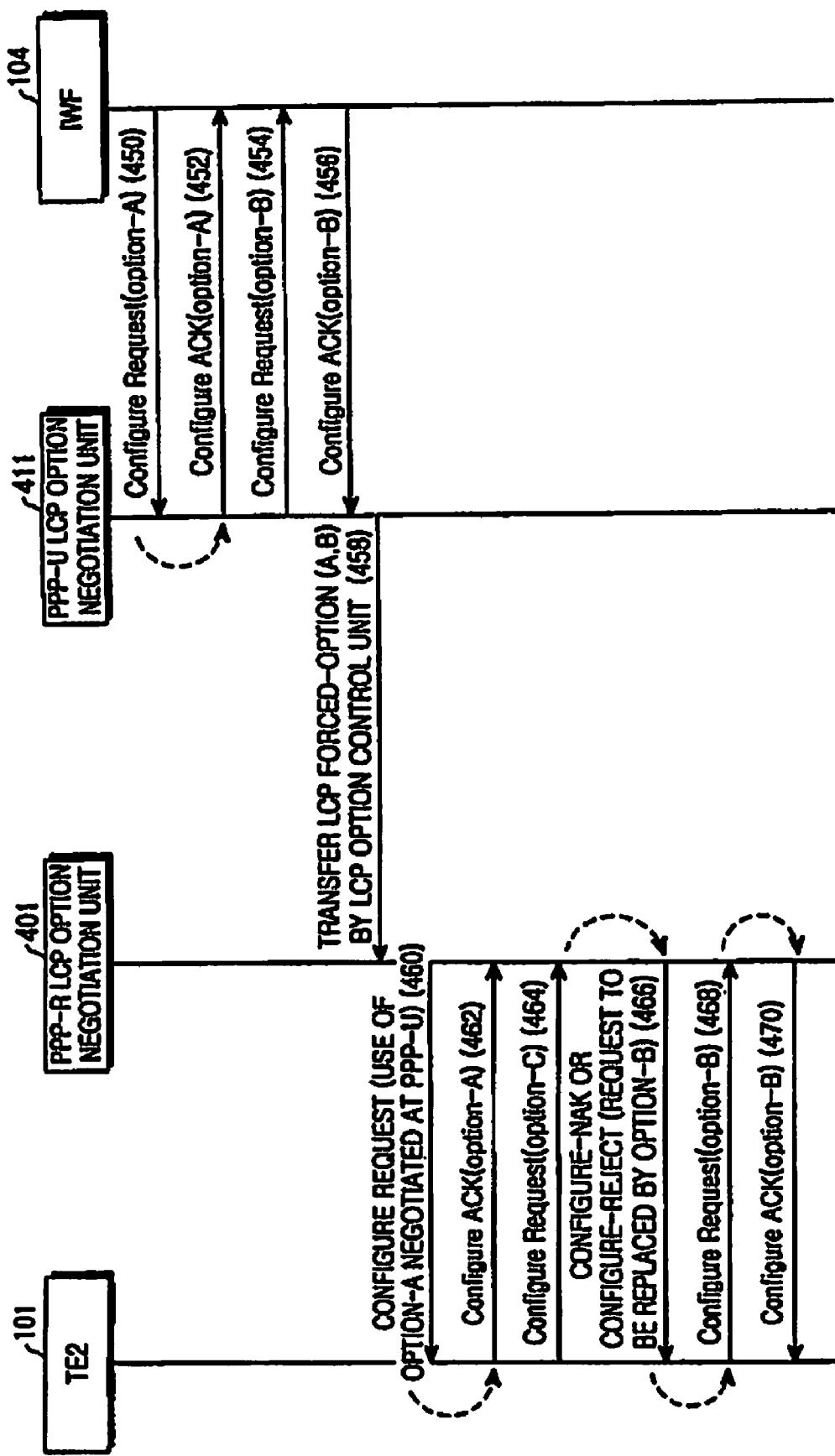
FIG. 4 is a view illustrating a scenario of progressing a PPP option negotiation at the Um interface and progressing a PPP option negotiation at the Rm interface according to the present invention.

FIG. 4 is a view illustrating a detailed scenario of progressing a PPP option negotiation in the Um interface 760 and progressing a PPP option negotiation at the Rm interface 750 according to the present invention.

As described above, the primary feature of the present invention is to negotiate LCP Option-A and Option-B, which are identical to those negotiated at the Um interface 760, on the Rm interface 750.

First, in step 450, the IWF 104 transmits a configuration request packet requesting Option-A to be configured to the PPP-U LCP option negotiation unit 411 of the MT2 600 in order to configure a PPP. When the MT2 600 accepts the Option-A of the configuration request packet received in step 450, the LCP option negotiation unit 411 transmits a Configure-ACK packet including the Option-A to the IWF 704 in step 452. In contrast, when the MT2 600 rejects the Option-A of the configuration request packet received in step 450, the LCP option negotiation unit 411 transmits a Configure-NAK packet, which includes an option desired by the MT2 600 with respect to a downlink, to the IWF 704.

In step 454, the MT2 600 transmits a configuration request packet including Option-B, that is, an option value which the MT2 600 desires to use with respect to an uplink during a PPP-U session negotiation, to the IWF 704. When receiving the configuration request packet transmitted by the MT2 600 in step 454, the IWF 704 transmits a Configure-ACK packet including the Option-B to the MT2 600 in step 456 when the IWF 704 can accept the Option-B desired by the MT2 600.

In FIG. 4, the Option-A represents an option requested from the IWF 704 to the MT2 600, and the Option-B represents an option requested from the MT2 600 to the IWF 704. In the following description, the Option-A and the Option-B will be inclusively designated as Option-U, as occasion arises.

When the option value negotiation for a PPP configuration between the MT2 600 and the IWF 104 has been completed through steps 450 to 456, an LCP option control unit 430 of the MT2 600 transmits the Option-A and Option-B, which are option values stored in variable "Option-U" of the LCP option negotiation unit 411 in the PPP-U function block 602, to an LCP option negotiation unit 401 in a PPP-R function block 606 in step 458.

In step 460, the LCP option negotiation unit 401 in the PPP-R function block 606 of the MT2 600 transmits a configuration request packet requesting the Option-A, which is an option value relating to the downlink among option values negotiated through the PPP-U function block 602, to be configured to the TE2 701.

That is, in step 460, the LCP option negotiation unit 401 in the PPP-R function block 606 of the MT2 600 requests the TE2 701 to set the Option-A negotiated by the request of the IWF 704, when connecting an Rm interface PPP with the TE2 701.

Then, in step 462, when the TE2 701 can accept the Option-A included in the configuration request packet received in step 460, the TE2 701 transmits a Configure-ACK packet in which the Option-A is configured.

In contrast, when the TE2 701 cannot accept the Option-A included in the configuration request packet received from the MT2 600 in step 460, the TE2 701 transmits a Configure-NAK packet including an option value desired by the TE2 701 itself, other than the Option-A, to the MT2 600 in step 462. However, when the TE2 701 accepts the Option-A, the TE2 701 transmits a configuration request packet including Option-C, that is, an option value which the TE2 701 desires to use with respect to an uplink, in step 464. When receiving the configuration request packet including the Option-C, that is, an option value which the TE2 701 desires to use, from the TE2 701, the LCP option negotiation unit 401 in the PPP-R function block 606 rejects the request of the TE2 701, and transmits, to the TE2 701, a Configure-NAK or Configure-Reject packet which requests the Option-C requested by the TE2 701 to be replaced by the Option-B negotiated through steps 454 and 456 in step 466.

When receiving neither a Configure-NAK packet or nor a Configure-Reject packet from the TE2 701, differently from steps 462 and 464, the MT2 600 performs a control operation to operate in the pseudo network mode, as described in step 208 of FIG. 2 and step 310 of FIG. 3, which is shown in detail in steps 466 to 470 of FIG. 4. When the TE2 701 transmits a Configure-NAK or Configure-Reject packet of rejecting an option value, which has been negotiated in the PPP-U layer and transmitted from MT2 600 in step 460, in step 462 of FIG. 4, the MT2 600 proceeds to step 209 of FIG. 2 or step 311 of FIG. 3.

That is, in step 466, the MT2 600 leads the TE2 to match the option requested by the TE2 701, as described in step 464, with the Option-B negotiated at the Um interface 160. To this end, when the LCP Option-C requested by the TE2 701 is different from the Option-B, the MT2 600 may transmit a Configure-NAK or Configure-Reject packet to again request the TE2 701 to accept the Option-B. In this case, the Configure-NAK packet is configured in such a manner as to transmit a substitute Option-B value together with a corresponding NAK option, and the Configure-Reject packet is configured in such a manner as to express and transmit only a corresponding option because the corresponding value is not included.

The FIG. 5 shows a format of a packet for an LCP option negotiation which is applied to the present invention. FIG. 5 shows the formats of a Configure-Request packet 500, a Configure-ACK packet 502, a Configure-NAK packet 504, and a Configure-Reject packet 506.

The All LCP options to be negotiated are described below, the LCP options are described in RFC 1662, and option fields 500a, 502a, 504a, and 506a of the packets include, respectively, a Maximum Receive Unit (MRU) value, an authentication value, a quality protocol value, a magic number value, a protocol field compression value, an address and control field compression value, and an Asynchronous Control Character Map (ACCM) value.

The MRU value indicates a maximum size of a receiving packet size. The authentication value indicates an authentication option. The quality protocol value indicates a link quality option. The magic number value indicates a magic number for link identification. The protocol field compression value indicates a protocol field compression. The address and control field compression value indicates an address/control field compression. The ACCM value indicates a designation of control character processing map.

Figure 6:
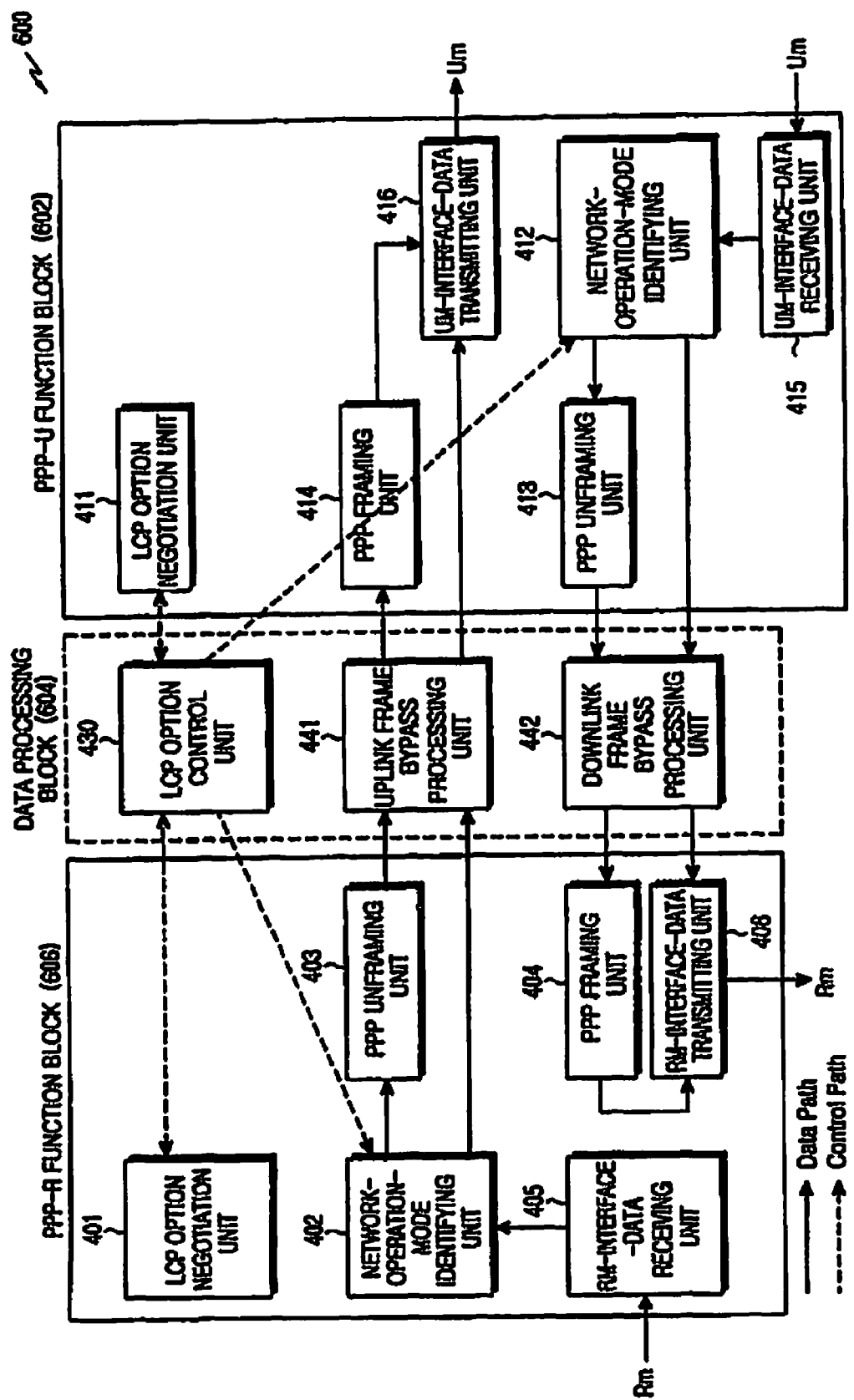
FIG. 6 is a block diagram of an MT2 according to the present invention.

The FIG. 6 shows the MT2 600 according to the present invention.

According to the present invention, the MT2 600 includes the PPP-R function block 606, the PPP-U function block 602, and a data processing block 604.

The data processing block 604 includes the LCP option control unit 430, an uplink frame bypass processing unit 441 and a downlink frame bypass processing unit 442, which relay PPP frames between the PPP-R and the PPP-U. The LCP option control unit 430 relays LCP option information between the PPP function blocks 602 and 606, and notifies the PPP function blocks 602 and 606 of a current network operation mode.

The LCP option control unit 430 manages a network operation mode, which is determined by the LCP option negotiation unit 411 of the PPP-U function block 602 and the LCP option negotiation unit 401 of the PPP-R function block 606, and transfers information about the network operation mode to network-operation-mode identifying units 402 and 412 in the PPP function blocks 602 and 606. When PPP-R and PPP-U connection procedures have been individually finished, and an Rm-interface-data receiving unit 405 has received a PPP frame from the TE2 701 through the Rm interface 750, the network-operation-mode identifying unit 402 checks whether the current mode is the full network mode or the pseudo network mode, thereby determining whether to transmit the received frame to a PPP unframing unit 403 or to the uplink frame bypass processing unit 441 without passing through an unframing process. That is, as described with reference to FIG. 4, since each of the LCP option negotiation units 401 and 411 in the PPP-R function block 606 and PPP-U function block 602 performs a PPP-U negotiation or PPP-R negotiation with each corresponding peer, each LCP option negotiation unit 401 or 411 can recognize and store option values determined as a result of each negotiation.

In FIG. 6, the reason why an unframing process through the PPP unframing unit 403 is performed with respect to frames received through the Rm interface is that the frames configured according to an option of the Rm interface must be subjected to a framing process based on an option of the Um interface. Such an operation is applied not only to an uplink but also to a downlink in the same way, in which when the operation is performed at every frame, it corresponds to the full network mode.

The LCP option control unit 430 determines a network operation mode based on LCP negotiation results of the LCP option negotiation units 411 and 401 in the PPP-U and PPP-R function blocks, and notifies the network-operation-mode identifying units 412 and 402 of the current network mode, so that the network-operation-mode identifying units 412 and 402 can determine whether the current network mode is the full network mode or the pseudo network mode.

In the case of an uplink frame, in the full network mode, a frame received through the Rm interface is sent to the uplink frame bypass processing unit 441 via the PPP unframing unit 403, and is then transferred to a PPP framing unit 414 of the PPP-U function block 602.

In contrast, in the pseudo network mode, since the PPP unframing/framing procedures are omitted, a received frame is transferred directly to the uplink frame bypass processing unit 441, and is then transmitted to a Um-interface-data transmitting unit 416. The Um-interface-data transmitting unit 416 functions to transmit a packet (PPP frame) received from the uplink frame bypass processing unit 441 to the IWF 704. In this document, the term "packet" is used with the same meaning as a PPP frame.

In the case of a downlink frame, when receiving a PPP frame from the IWF 704 through a Um-interface-data receiving unit 415, the network-operation-mode identifying unit 412 checks whether the current mode is the full network mode or the pseudo network mode, thereby determining whether to transmit the received frame to a PPP unframing unit 413 or to a downlink frame bypass processing unit 442 without passing through an unframing process.

In the full network mode, a frame received from the IWF 104 through the Um interface is sent to the downlink frame bypass processing unit 442 via the PPP unframing unit 413, and is then transferred to a PPP framing unit 404 of the PPP-R function block 606. The LCP option control unit 430 determines the current network operation mode, based on negotiation results of the LCP option negotiation units 411 and 401 in the PPP-U and PPP-R function blocks, and notifies the respective network-operation-mode identifying units 412 and 402 of the current network mode. When negotiation at the PPP-R has been completed to use the same option as that negotiated at the PPP-U, the LCP option control unit 430 determines a network mode. In this case, if receiving a NAK or Reject packet from a peer side during the PPP-R negotiation procedure, the LCP option control unit 430 determines the network mode as the full network mode, but if not, the CP option control unit 430 determines the network mode as the pseudo network mode.

As described above, in the pseudo network mode according to the present invention, since the PPP unframing/framing procedures are omitted, a received packet is transferred directly to the downlink frame bypass processing unit 442, and is then transmitted to an Rm-interface-data transmitting unit 406. The Rm-interface-data transmitting unit 406 transfers a packet (PPP frame), which has been received from the PPP framing unit 404 or the downlink frame bypass processing unit 442, to the TE2 701 through the Rm interface.

The Rm-interface-data receiving unit 405 functions to transmit a packet, which has been received from the TE2 701 through the Rm interface, to the network-operation-mode identifying unit 402 to transmit the received packet to the IWF 704. The Rm-interface-data transmitting unit 406 functions to transmit data, which has been received from the PPP framing unit 404 or the downlink frame bypass processing unit 442, to the TE2 701 through the Rm interface. As shown in FIG. 6, the uplink frame bypass processing unit 441 transfer an IP packet, which has been received after being unframed in the PPP unframing unit 403, to the PPP framing unit 414 of the PPP-U function block 602 because the received IP packet must again be framed to be suitable to an option negotiated at the Um interface.

In contrast, the uplink frame bypass processing unit 441 transfers a frame, which has been received directly from the network-operation-mode identifying unit 402 without being unframed, to the Um-interface-data transmitting unit 416 as it is. The downlink frame bypass processing unit 442 also performs an operation similar to that of the uplink frame bypass processing unit 441. That is, the downlink frame bypass processing unit 442 transfers an IP packet, which has been received from the PPP unframing unit 413, to the PPP framing unit 404 so as to frame the received IP packet because the received IP packet must again be framed to be suitable to an option negotiated at the Rm interface, and then transmits the framed IP packet to the TE2 701 through the Rm-interface-data transmitting unit 406. In contrast, the downlink frame bypass processing unit 442 transfers a frame, which has been received directly from the network-operation-mode identifying unit 412 without being unframed, to the TE2 701 through the Rm-interface-data transmitting unit 406.

The network-operation-mode identifying unit 402 can recognize whether the current network mode is the pseudo network mode or the full network mode by information notified from the LCP option control unit 430. When the current network mode is the pseudo network mode, the network-operation-mode identifying unit 402 transmits data, which has been received through the Rm-interface-data receiving unit 405, directly to the uplink frame bypass processing unit 441 without passing through a PPP unframing process. In contrast, when the current network mode is the full network mode, the network-operation-mode identifying unit 402 transmits data, which has been received through the Rm-interface-data receiving unit 405, to the PPP unframing unit 403.

As shown in FIG. 3, when the MT2 600 is handed over and thus transmits/receives packets to/from a new IWF, that is, when the IWF 704 is handed over, each block operates as follows.

When the IWF 704 is handed over, the LCP option negotiation unit 411 of the PPP-U function block 602 determines first option information to be used for a PPP link on the Um interface between the MT2 600 and the IWF 104 through negotiation according to an LCP between the MT2 600 and the IWF 104.

In contrast, the LCP option negotiation unit 401 of the PPP-R function block 606 has already established second option information to be used for a PPP link on the Rm interface between the TE2 701 and the MT2 600 through LCP negotiation. Then, the LCP option control unit 430 of the data processing block 604 compares the first option information determined by the LCP option negotiation unit 411 of the PPP-U function block 602 with the second option information used on the Rm interface, and determines if the two pieces of information are identical.

When the first option information and the second option information are identical to each other, the LCP option control unit 430 of the data processing block 604 instructs each function block to operate in the pseudo network mode, in which frames transmitted/received through the PPP links between the TE2 701 and the IWF 104 are not unframed and framed.

Effects of the present invention will now be described.

First, since a link option negotiated at the Um interface is forced to be used at the Rm interface, it is possible to achieve option synchronization between the PPP-U and the PPP-R.

Second, upon a handover between PDSNs, an option used in the previous network is forced to be used in a Um interface PPP negotiation procedure, thereby establishing the same option at a new Um interface.

Third, upon a handover between PDSNs, if option synchronization fails in a Um interface PPP negotiation procedure, a PPP renegotiation for the Rm interface is performed by means of an option determined in a Um interface PPP negotiation procedure, thereby getting an opportunity to achieve the option synchronization once more.

As described above, the present invention increases an opportunity to omit packet unframing/framing procedures, which are inefficient in the relay of frames between multiple PPP layers, thereby enhancing the processing efficiency.

In addition, in PPP-R and PPP-U link option negotiation procedures for network modes, since there is a low probability that diverse links have the same characteristics, the method of the present invention of forcing a desired option to be determined is more efficient than a conventional passive method of determining whether negotiation has been achieved by means of a default option.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for setting up a Point-to-Point Protocol (PPP) link for transmitting a packet between a Terminal Equipment (TE) and a first Interworking Function (IWF), which connects the TE and a packet network to each other, the method comprising the steps of:
    determining first option information to be used for a PPP link on a Um interface between a Mobile Terminal (MT) and a second IWF, through negotiation according to a Link Control Protocol (LCP) between the MT and the second IWF, when the TE transmits/receives a packet to/from the second IWF on account of a handover of the MT;
    checking if second option information used for a PPP link on an Rm interface between the MT and the TE is identical to the first option information;
    resetting the second option information through LCP negotiation between the MT and the TE in such a manner as to make the second option information be identical to the first option information, when it is determined that the first and second option information are not identical to each other as a result of the checking; and
    transmitting, by the MT, frames transmitted/received through PPP links between the TE and the second IWF without performing unframing and framing processes, when it is determined that the first and second option information are identical to each other as a result of the checking or when the second option information is reset to be identical to the first option information.

2. The method as claimed in claim 1, wherein the first option information comprises first option values to be used when the second IWF transmits frames to the MT, and second option values to be used when the MT transmits frames to the second IWF.

3. An apparatus for setting up a Point-to-Point Protocol (PPP) link between a Terminal Equipment (TE) and first Interworking Function (IWF), which connects the TE and a packet network to each other, in a Mobile Terminal (MT) for setting up the PPP link for transmitting a packet between the TE and the first IWF, the apparatus comprising:
    a first function block for determining first option information to be used for a PPP link on a Um interface between the MT and a second IWF, through negotiation according to a Link Control Protocol (LCP) between the MT and the second IWF when the TE transmits/receives a packet to/from the second IWF on account of a handover of the MT, and transmitting/receiving frames through the Um interface;
    a second function block for determining second option information to be used for a PPP link on an Rm interface between the TE and the MT, through LCP negotiation between the TE and the MT, and transmitting/receiving frames through the Rm interface;
    a third function block for resetting the second option information through LCP negotiation between the MT and the TE in such a manner as to make the second option information be identical to the first option information, when the first option information determined by the first function block is not identical to the second option information determined by the second function block;
    a data processing block for instructing the first and second function blocks not to operate unframing and framing frames transmitted/received through PPP links between the TE and the second IWF, when the first option information determined by the first function block is identical to the second option information used in the second function block or when the second option information is reset to be identical to the first option information.

4. The apparatus as claimed in claim 3, wherein the first option information comprises first option values to be used when the second IWF transmits frames to the MT, and second option values to be used when the MT transmits frames to the second IWF.

* * * * *